United States Patent
Kim et al.

(10) Patent No.: US 10,428,182 B2
(45) Date of Patent: Oct. 1, 2019

(54) SULFIDE-BASED POLYMER, FILM COMPRISING SAME AND METHOD FOR PREPARING SAME

(71) Applicant: LG CHEM, LTD., Seoul (KR)

(72) Inventors: Sanggon Kim, Daejeon (KR); Hyungsam Choi, Daejeon (KR); Duk Hun Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 82 days.

(21) Appl. No.: 15/741,642

(22) PCT Filed: Jul. 7, 2017

(86) PCT No.: PCT/KR2017/007302
§ 371 (c)(1),
(2) Date: Jan. 3, 2018

(87) PCT Pub. No.: WO2018/012812
PCT Pub. Date: Jan. 18, 2018

(65) Prior Publication Data
US 2019/0077918 A1    Mar. 14, 2019

(30) Foreign Application Priority Data
Jul. 15, 2016    (KR) .................. 10-2016-0090102

(51) Int. Cl.
| | | |
|---|---|---|
| C08L 81/02 | (2006.01) | |
| C08L 81/06 | (2006.01) | |
| C08J 5/18 | (2006.01) | |
| C08G 75/20 | (2016.01) | |
| C08G 75/0204 | (2016.01) | |

(Continued)

(52) U.S. Cl.
CPC ..... *C08G 75/0245* (2013.01); *C08G 75/0204* (2013.01); *C08G 75/0209* (2013.01); *C08G 75/0227* (2013.01); *C08G 75/0236* (2013.01); *C08G 75/20* (2013.01); *C08J 5/18* (2013.01); *C08L 81/02* (2013.01); *C08L 81/06* (2013.01);
(Continued)

(58) Field of Classification Search
CPC .... C08G 75/20; C08G 75/23; C08G 75/0204; C08G 75/0227; C08G 75/0236; C08G 75/0245; C08L 81/02; C08L 81/06; C09D 181/02; C09D 181/06; C09J 181/02; C09J 181/06; C08J 2381/02; C08J 2381/06
See application file for complete search history.

(56) References Cited

U.S. PATENT DOCUMENTS

| | | |
|---|---|---|
| 4,777,228 A | 10/1988 | Mizuno et al. |
| 7,931,946 B2 | 4/2011 | Cheong et al. |

FOREIGN PATENT DOCUMENTS

| | | |
|---|---|---|
| DE | 1957091 A1 | 6/1970 |
| EP | 2 463 326 A1 | 6/2012 |

(Continued)

OTHER PUBLICATIONS

Ding et al., "Novel Synthesis of Poly(arylene thioether)s via One-pot Polymerization of Bis(N,N'-dimethyl-S-carbamate)s with Activated Dihalo Aromatic Compounds", Tetrahedron, 1997, vol. 53, No. 45, pp. 15237-15246.

(Continued)

*Primary Examiner* — Kregg T Brooks
(74) *Attorney, Agent, or Firm* — Birch, Stewart, Kolasch & Birch, LLP

(57) ABSTRACT

The present disclosure provides a sulfide-based polymer, a film comprising the same, and a method for preparing the same.

10 Claims, 3 Drawing Sheets

(51) Int. Cl.
*C08G 75/0209* (2016.01)
*C08G 75/0227* (2016.01)
*C08G 75/0236* (2016.01)
*C08G 75/0245* (2016.01)

(52) U.S. Cl.
CPC ........ *C08J 2381/02* (2013.01); *C08J 2381/06* (2013.01)

(56) References Cited

FOREIGN PATENT DOCUMENTS

| EP | 2 902 431 A1 | 6/2012 |
|---|---|---|
| JP | 2008-69212 A | 3/2008 |
| KR | 10-2011-0003445 A | 1/2011 |
| KR | 10-2012-0038363 A | 4/2012 |
| WO | WO 2014/157389 A | 10/2014 |

OTHER PUBLICATIONS

Hara et al., "Novel Synthesis of Aromatic Polysulfides from S,S'-Bis(trimethylsilyl)-Substituted Aromatic Dithiols and Activated Aromatic Dihalides", Journal of Polymer Science: Part A: Polymer Chemistry, vol. 29, (1991), pp. 1933-1940.
European Search Report for Appl. No. 17818413.1 dated Jun. 25, 2018.

[FIG. 1]
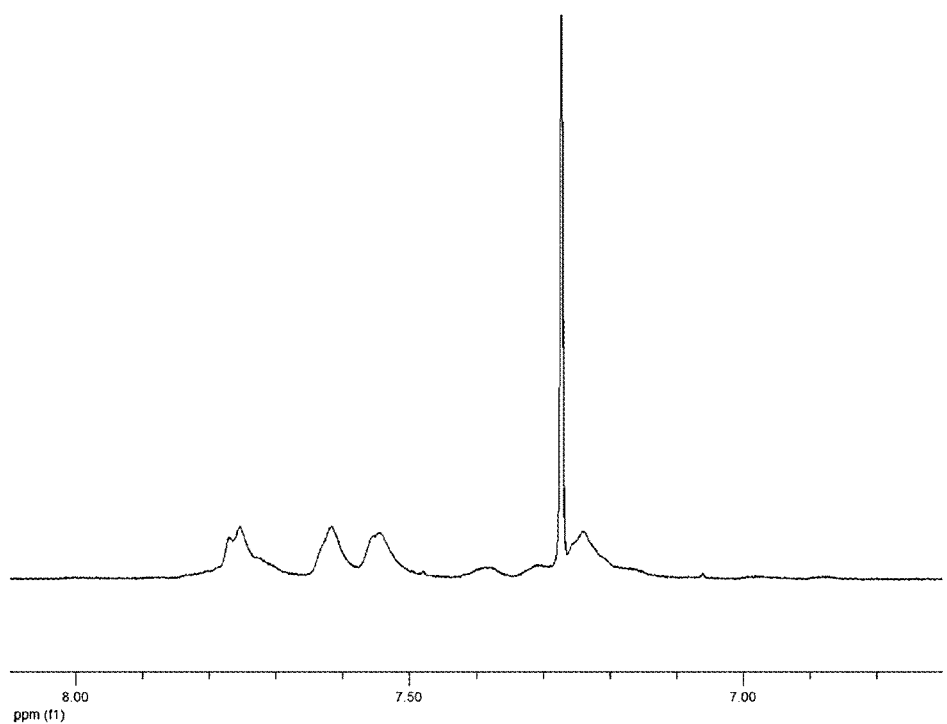

[FIG. 2]
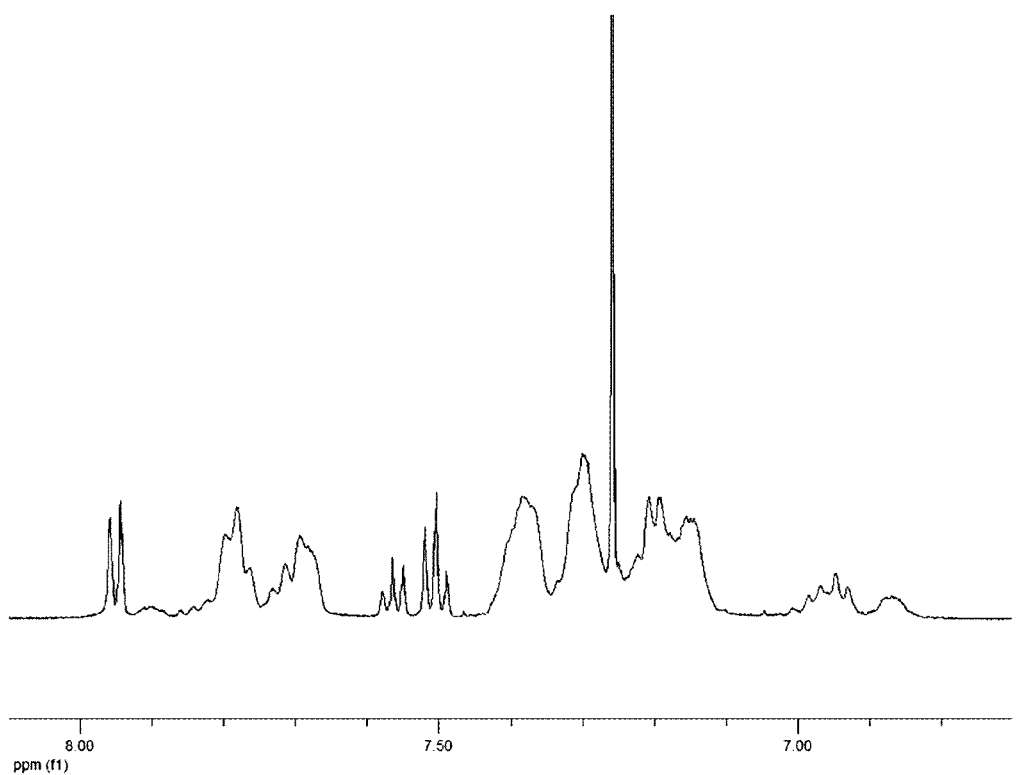

[FIG. 3]
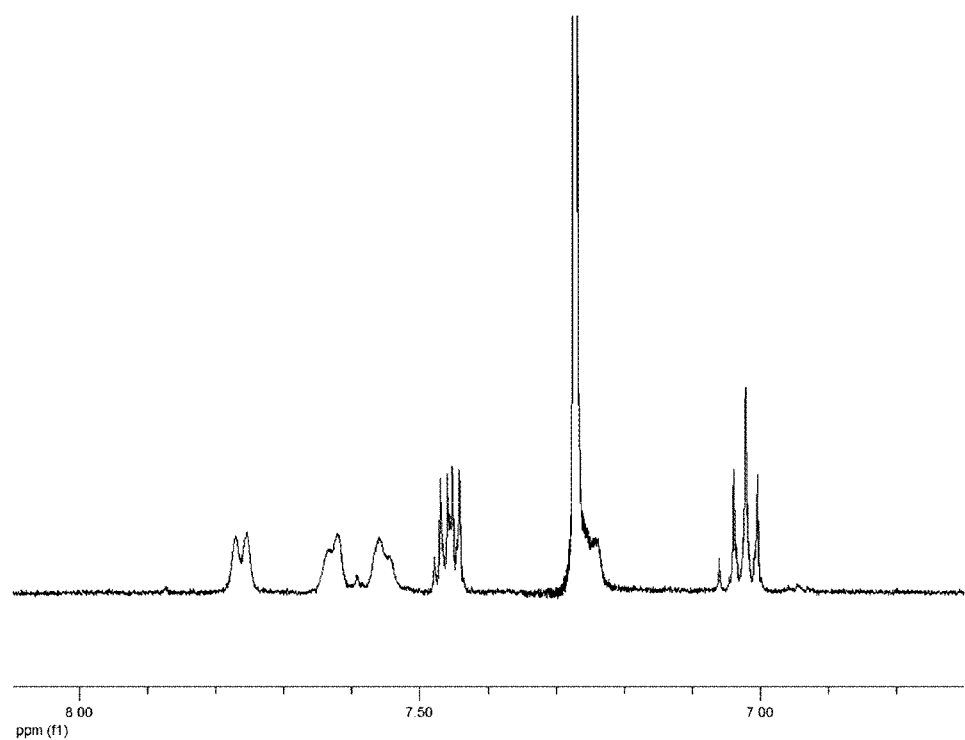

SULFIDE-BASED POLYMER, FILM COMPRISING SAME AND METHOD FOR PREPARING SAME

TECHNICAL FIELD

This application claims priority to and the benefits of Korean Patent Application No. 10-2016-0090102, filed with the Korean Intellectual Property Office on Jul. 15, 2016, the entire contents of which are incorporated herein by reference.

The present disclosure relates to a sulfide-based polymer, a film comprising the same, and a method for preparing the same.

BACKGROUND ART

Sulfide-based polymers have properties of excellent heat resistance, flame retardancy, rigidity, chemical resistance, electric insulation, low hygroscopicity and the like, and are particularly useful in electric and electronic devices, mechanical components, automotive components, and the like.

Recently, development of sulfide-based resins dissolved in organic solvents has been required to be used in transparent polymer films. General sulfide-based resins have reduced solubility due to n-n stacking between polymer chains, and although monomers that are refracted or have a large volume have been used in order to overcome this problem, this is disadvantageous in high molecular weight syntheses.

Accordingly, development of sulfide-based polymers capable of being used in transparent polymer films, having high solubility in organic solvents, and having a high molecular weight has been required.

DISCLOSURE

Technical Problem

The present specification is directed to providing a sulfide-based polymer, a film comprising the same, and a method for preparing the same.

Technical Solution

One embodiment of the present specification provides a polymer comprising a first unit represented by the following Chemical Formula 1 and a second unit represented by the following Chemical Formula 2.

[Chemical Formula 1]

[Chemical Formula 2]

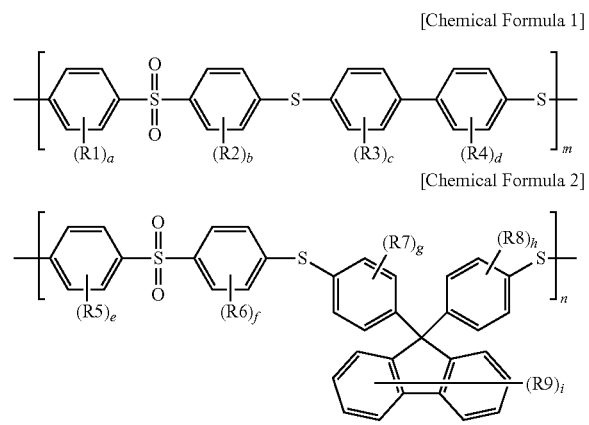

In Chemical Formulae 1 and 2,

R1 to R9 are the same as or different from each other, and each independently hydrogen; deuterium; a halogen group; a substituted or unsubstituted alkyl group; a substituted or unsubstituted cycloalkyl group; a substituted or unsubstituted aryl group; or a substituted or unsubstituted heterocyclic group, or adjacent substituents bond to each other to form a substituted or unsubstituted aromatic cyclic group, a to h are each an integer of 0 to 4, i is an integer of 0 to 8, when a to i are 2 or greater, substituents in the parentheses are the same as or different from each other, and m and n are each an integer of 1 to 1000.

Another embodiment of the present application provides a film comprising the polymer described above.

Still another embodiment of the present application provides a method for preparing a film comprising preparing a polymer solution by dissolving the polymer in an organic solvent; and preparing a film by casting the polymer solution.

Advantageous Effects

A polymer according to one embodiment of the present application is capable of obtaining a high molecular weight when carrying out polymerization using a first unit and a second unit that are different from each other, and obtains a low molecular weight when carrying out polymerization using each unit alone due to reduced polymerization reactivity. Accordingly, a film is readily prepared when using a polymer having a high molecular weight compared to when using a polymer having a low molecular weight.

DESCRIPTION OF DRAWINGS

FIG. 1 shows a nuclear magnetic resonance (NMR) spectrum of a polymer of Preparation Example 1.

FIG. 2 shows a nuclear magnetic resonance (NMR) spectrum of a polymer of Preparation Example 2.

FIG. 3 shows a nuclear magnetic resonance (NMR) spectrum of a polymer of Preparation Example 3.

MODE FOR DISCLOSURE

Hereinafter, the present specification will be described in more detail.

The present specification provides a polymer comprising a first unit represented by Chemical Formula 1 and a second unit represented by Chemical Formula 2.

In the present specification, "derived" means producing new bonds as bonds of a compound break or substituents fall off, and a unit derived from the compound may mean a unit linked to a main chain of a polymer. The unit may form a polymer by being comprised of a main chain in the polymer.

In the present specification, the "unit" means a repeated structure of a monomer being comprised of a polymer, and means a structure in which a monomer is bound in a polymer through polymerization.

Examples of substituents in the present specification are described below, however, the substituents are not limited thereto.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of deuterium; a halogen group; a cyano group; an alkyl group; a cycloalkyl group; an aryl group; and a heterocyclic group, or being substituted with a substituent linking two or more substituents among the substituents illustrated above, or having no substituents. For example, "a substituent linking two or more substituents" may include a biphenyl group. In other words, a biphenyl group may be an aryl group, or interpreted as a substituent linking two phenyl groups.

In the present specification, examples of the halogen group may include fluorine, chlorine, bromine or iodine.

In the present specification, the alkyl group may be linear or branched, and although not particularly limited thereto, the number of carbon atoms is preferably from 1 to 50. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the cycloalkyl group is not particularly limited, but preferably has 3 to 60 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, when the aryl group is a monocyclic aryl group, the number of carbon atoms is not particularly limited, but is preferably from 6 to 25. Specific examples of the monocyclic aryl group may include a phenyl group, a biphenyl group, a terphenyl group and the like, but are not limited thereto.

When the aryl group is a multicyclic aryl group, the number of carbon atoms is not particularly limited, but is preferably from 10 to 24. Specific examples of the multicyclic aryl group may include a naphthyl group, an anthracenyl group, a phenanthryl group, a pyrenyl group, a perylenyl group, a chrysenyl group, a fluorenyl group and the like, but are not limited thereto.

In the present specification, the fluorenyl group may be substituted, and adjacent substituents may bond to each other to form a ring.

When the fluorenyl group is substituted,

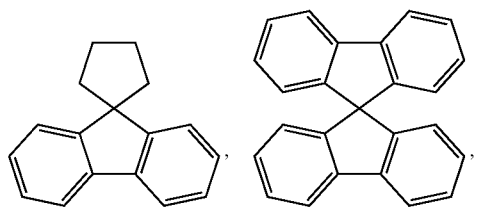

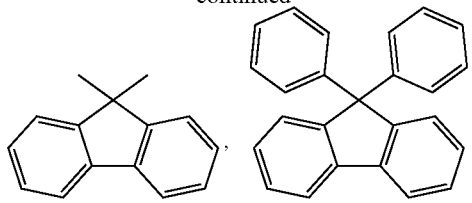

like may be included. However, the structure is not limited thereto.

In the present specification, the heterocyclic group is a group including one or more atoms that are not carbon, that is heteroatoms, and specifically, the heteroatom may include one or more atoms selected from the group consisting of O, N, Se, S and the like. The number of carbon atoms of the heterocyclic group is not particularly limited, but is preferably from 2 to 60. Examples of the heterocyclic group may include a thiophene group, a furanyl group, a pyrrole group, an imidazolyl group, a thiazolyl group, an oxazolyl group, an oxadiazolyl group, a triazolyl group, a pyridyl group, a bipyridyl group, a pyrimidyl group, a triazinyl group, an acridly group, a hydroacridyl group (for example,

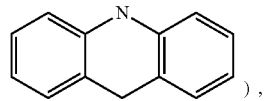 [SMILES: c1ccc2c(c1)Cc1ccccc1N2]), a pyridazinyl group, a pyrazinyl group, a quinolinyl group, a quinazolinyl group, a quinoxalinyl group, a phthalazinyl group, a pyridopyrimidinyl group, a pyridopyrazinyl group, a pyrazinopyrazinyl group, an isoquinolinyl group, an indole group, a carbazolyl group, a benzoxazolyl group, a benzimidazolyl group, a benzothiazolyl group, a benzocarbazolyl group, a dibenzocarbazolyl group, a benzothiophene group, a dibenzothiophene group, a benzofuranyl group, a dibenzofuranyl group, a benzosilole group, a dibenzosilole group, a phenanthrolinyl group, an isoxazolyl group, a thiadiazolyl group, a phenothiazinyl group, a phenoxazinyl group, fused structures thereof and the like, but are not limited thereto. In addition thereto, examples of the heterocyclic group may include a heteroring structure including a sulfonyl group, for example,

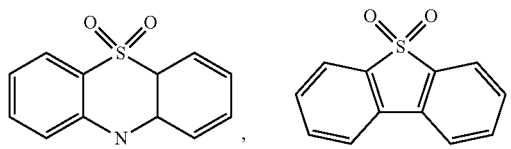 [SMILES: O=S1(=O)c2ccccc2NC2C=CC=CC21 ; O=S1(=O)c2ccccc2-c2ccccc21]

and the like.

In the present specification, the "adjacent" group may mean a substituent substituting an atom directly linked to an atom substituted by the corresponding substituent, a substituent sterically most closely positioned to the corresponding substituent, or another substituent substituting an atom substituted by the corresponding substituent. For example, two substituents substituting ortho positions in a benzene ring, and two substituents substituting the same carbon in an aliphatic ring may be interpreted as groups "adjacent" to each other.

In the present specification, the aromatic cyclic group may be monocyclic or multicyclic, and may be selected from among the examples of the aryl group.

In one embodiment of the present specification, R1 to R9 are the same as or different from each other, and each independently hydrogen; deuterium; a halogen group; a substituted or unsubstituted alkyl group; or a substituted or unsubstituted aryl group.

In one embodiment of the present specification, R1 to R9 are the same as or different from each other, and each independently hydrogen; deuterium; a halogen group; an alkyl group; or an aryl group.

In one embodiment of the present specification, R1 to R9 are the same as or different from each other, and each independently hydrogen; deuterium; F; a methyl group; or a phenyl group.

In one embodiment of the present specification, R1 to R9 are the same as or different from each other, and each independently hydrogen or deuterium.

In one embodiment of the present specification, the content of the first unit is greater than or equal to 1% by weight and less than or equal to 99% by weight, and the content of the second unit is greater than or equal to 1% by weight and less than or equal to 99% by weight in the polymer. When the above-mentioned range is satisfied, excellent effects are obtained in terms of securing film processability and heat resistance.

In one embodiment of the present specification, the first unit is derived from monomers of the following Chemical Formulae 3 and 4.

[Chemical Formula 3]

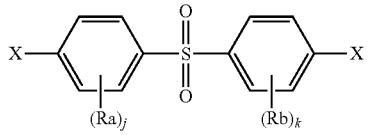

[Chemical Formula 4]

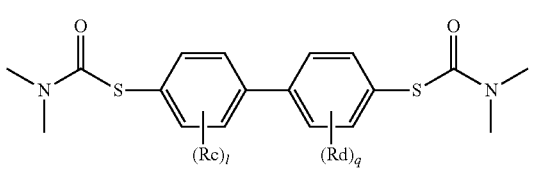

In Chemical Formulae 3 and 4, X is a halogen group,

Ra to Rd are the same as or different from each other, and each independently hydrogen, deuterium, a halogen group, a substituted or unsubstituted alkyl group, a substituted or unsubstituted cycloalkyl group, a substituted or unsubstituted aryl group, or a substituted or unsubstituted heterocyclic group, or adjacent substituents may bond to each other to form a substituted or unsubstituted aromatic cyclic group, and j to q are each an integer of 0 to 4, and when j to q are 2 or greater, substituents in the parentheses are the same as or different from each other.

In one embodiment of the present specification, X is F.

In one embodiment of the present specification, Ra and Rb are hydrogen.

In one embodiment of the present specification, Rc and Rd are hydrogen.

In one embodiment of the present specification, the first unit is derived from monomers of the following structures.

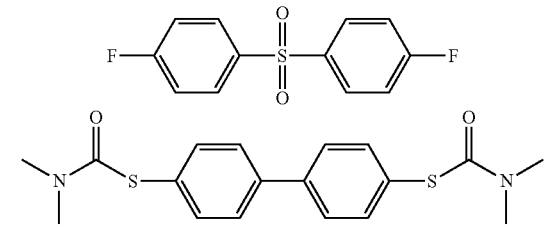

In one embodiment of the present specification, the second unit is derived from the monomer of Chemical Formula 3 and a monomer of the following Chemical Formula 5.

[Chemical Formula 5]

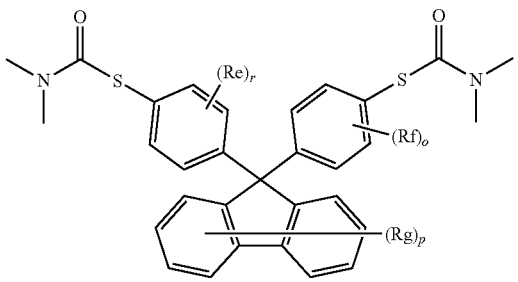

In Chemical Formula 5, Re to Rg are the same as or different from each other, and each independently hydrogen, deuterium, a halogen group, a substituted or unsubstituted alkyl group, a substituted or unsubstituted cycloalkyl group, a substituted or unsubstituted aryl group, or a substituted or unsubstituted heterocyclic group, or adjacent substituents may bond to each other to form a substituted or unsubstituted aromatic cyclic group, r and o are each an integer of 0 to 4, p is an integer of 0 to 8, and when r, o and p are 2 or greater, substituents in the parentheses are the same as or different from each other.

In one embodiment of the present specification, Re to Rg are hydrogen.

In one embodiment of the present specification, the second unit is derived from monomers of the following structures.

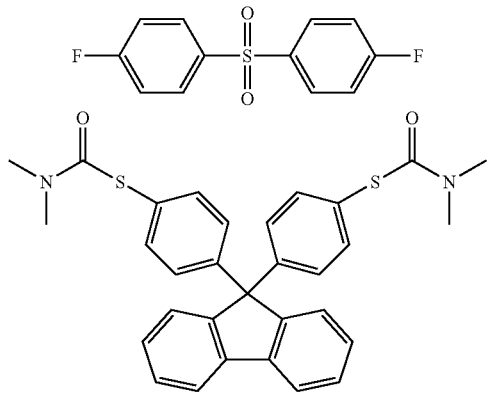

In one embodiment of the present specification, an end group of the monomer may be F or a methyl group.

In one embodiment of the present specification, the first unit and the second unit may form the polymer through condensation polymerization.

In one embodiment of the present specification, the polymer has a weight average molecular weight of 10,000 to 200,000.

The first unit and the second unit according to one embodiment of the present application may be prepared using a preparation method described below.

For example, as the units of Chemical Formulae 1 and 2, the core structure may be prepared as in the following Reaction Formula 1. Substituents may bond thereto using methods known in the art, and types, positions or the number of the substituents may vary depending on technologies known in the art.

[Reaction Formula 1]

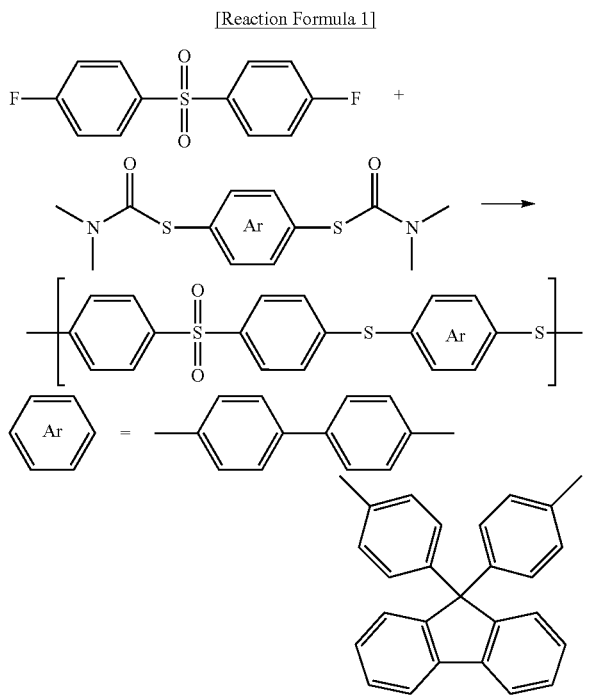

Another embodiment of the present specification provides a film comprising the polymer described above.

In one embodiment of the present specification, the film may be prepared by preparing a polymer solution through dissolving the above-described polymer in an organic solvent and then casting the polymer solution. The polymer is dissolved in an organic solvent, and therefore, when compared to film materials that are difficult to process, generally has excellent physical and chemical properties due to excellent processibility.

The organic solvent is not particularly limited in the present disclosure, and as the organic solvent, dimethylacetamide (DMAC), dimethylformamide (DMF), dimethyl sulfoxide (DMSO), tetrahydrofuran (THF) and acetone may be used, and one or more types thereof may be included.

In one embodiment of the present specification, the solid content of the polymer dissolved in the organic solvent may be from 0.1% by weight to 90% by weight, and preferably, may be 10% by weight.

According to one embodiment of the present specification, the film may have a thickness of 5 μm to 100 μm, and preferably 30 μm to 50 μm.

In one embodiment of the present specification, the film has a refractive index of greater than or equal to 1.7 and less than or equal to 5.

The refractive index in the present specification means a value measuring a refractive index using refractive index analysis equipment (Prism Coupler).

One embodiment of the present specification provides a method for preparing a film comprising preparing a polymer solution by dissolving the above-described polymer in an organic solvent; and preparing a film by casting the polymer solution.

In one embodiment of the present specification, the organic solvent includes one or more types selected from among dimethylacetamide (DMAC), dimethylformamide (DMF), dimethyl sulfoxide (DMSO), tetrahydrofuran (THF) and acetone.

In one embodiment of the present specification, the film prepared using the above-mentioned method has a thickness of 5 μm to 100 μm.

MODE FOR INVENTION

Preparation of the polymer and the film comprising the same described above will be specifically described in the following examples. However, the following examples are for illustrative purposes only, and the scope of the present specification is not limited thereto.

Preparation Example 1

After introducing bulky masked dithiol (0.2 eq.), biphenyl masked dithiol (0.8 eq.), difluorobenzosulfone (1 eq.), $Cs_2CO_3$ (0.5 eq.), $CaCO_3$ (3 eq.) and diphenylsulfone (9 eq.) to a flask, the result was stirred for 3 hours at 200° C. and 3 hours at 240° C. under nitrogen atmosphere. The viscous solution was precipitated in acetone and acid treated to obtain the following polymer.

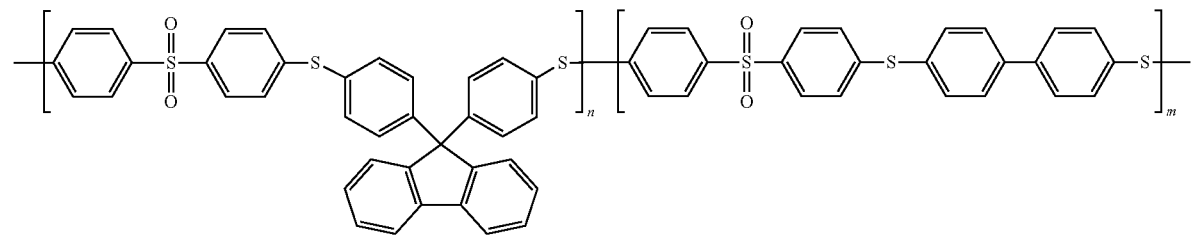

A nuclear magnetic resonance spectrum of the polymer obtained in Preparation Example 1 is shown in FIG. 1.

In the spectrum, an end-group peak was not observed.

In addition, when performing thermal analysis on the polymer using a thermogravimetric analyzer (TGA) and a differential scanning calorimetry (DSC) method, the polymer was stable up to 400° C., and the glass transition temperature was 240° C.

Preparation Example 2

The following polymer was obtained in the same manner as in Preparation Example 1 except that bulky masked dithiol (1 eq.) was used instead of bulky masked dithiol (0.2 eq.) and biphenyl masked dithiol (0.8 eq.).

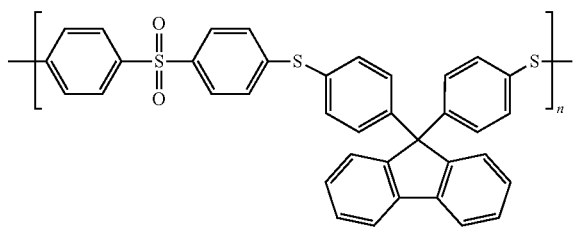

A nuclear magnetic resonance spectrum of the polymer obtained in Preparation Example 2 is shown in FIG. 2.

Preparation Example 3

The following polymer was obtained in the same manner as in Preparation Example 1 except that biphenyl masked dithiol (1 eq.) was used instead of bulky masked dithiol (0.2 eq.) and biphenyl masked dithiol (0.8 eq.).

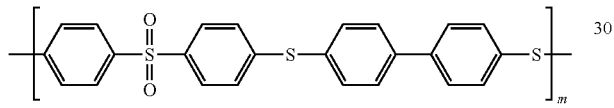

A nuclear magnetic resonance spectrum of the polymer obtained in Preparation Example 3 is shown in FIG. 3.

In the spectra of FIG. 2 and FIG. 3, an end-group peak was observed.

Example 1

After adding and dissolving the polymer prepared in Preparation Example 1 in dimethylacetamide (DMAC) in a weight ratio of 10:90, the result was casted, and then dried for a day by being placed in an oven set at 150° C., and as a result, a polymer film was prepared.

Comparative Examples 1 and 2

The polymers prepared in Preparation Examples 2 and 3 were not dissolved in dimethylacetamide (DMAC) in Example 1, and it was identified that the film was not able to be prepared.

In addition, it was identified that, when dissolving the polymer prepared in Preparation Example 1 in each of dimethylformamide (DMF), dimethyl sulfoxide (DMSO) and tetrahydrofuran (THF), the polymer was dissolved therein.

The invention claimed is:
1. A polymer comprising:
a first unit represented by the following Chemical Formula 1; and
a second unit represented by the following Chemical Formula 2:

[Chemical Formula 1]

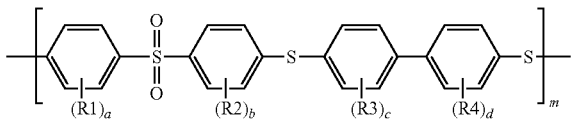

[Chemical Formula 2]

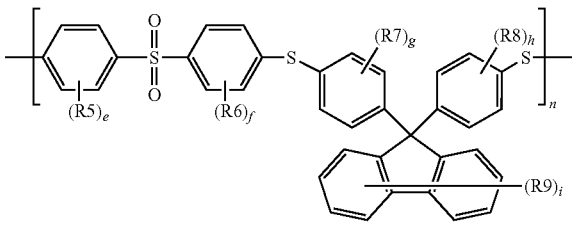

wherein, in Chemical Formulae 1 and 2, R1 to R9 are the same as or different from each other, and each independently hydrogen;
deuterium; a halogen group; a substituted or unsubstituted alkyl group; a substituted or unsubstituted cycloalkyl group; a substituted or unsubstituted aryl group; or a substituted or unsubstituted heterocyclic group, or adjacent substituents bond to each other to form a substituted or unsubstituted aromatic cyclic group;
a to h are each an integer of 0 to 4, i is an integer of 0 to 8;
when a to i are 2 or greater, substituents in the parentheses are the same as or different from each other; and
m and n are each an integer of 1 to 1000.

2. The polymer of claim 1, wherein, in the polymer, a content of the first unit is greater than or equal to 1% by weight and less than or equal to 99% by weight, and a content of the second unit is greater than or equal to 1% by weight and less than or equal to 99% by weight.

3. The polymer of claim 1, which has a weight average molecular weight of 10,000 to 200,000.

4. A film comprising the polymer of claim 1.

5. The film of claim 4, which is prepared by dissolving the polymer in an organic solvent and casting the result.

6. The film of claim 5, wherein the organic solvent includes one or more types of dimethylacetamide (DMAC), dimethylformamide (DMF), dimethyl sulfoxide (DMSO), tetrahydrofuran (THF) and acetone.

7. The film of claim 4, which has a thickness of 5 μm to 100 μm.

8. A method for preparing a film comprising:
preparing a polymer solution by dissolving the polymer of claim 1 in an organic solvent; and
preparing a film by casting the polymer solution.

9. The method for preparing a film of claim 8, wherein the organic solvent includes one or more types selected from among dimethylacetamide (DMAC), dimethylformamide (DMF), dimethyl sulfoxide (DMSO), tetrahydrofuran (THF) and acetone.

10. The method for preparing a film of claim 8, wherein the film has a thickness of 5 μm to 100 μm.

* * * * *